April 30, 1929.  C. H. SMOOT  1,711,066
REGULATOR
Filed April 29, 1927
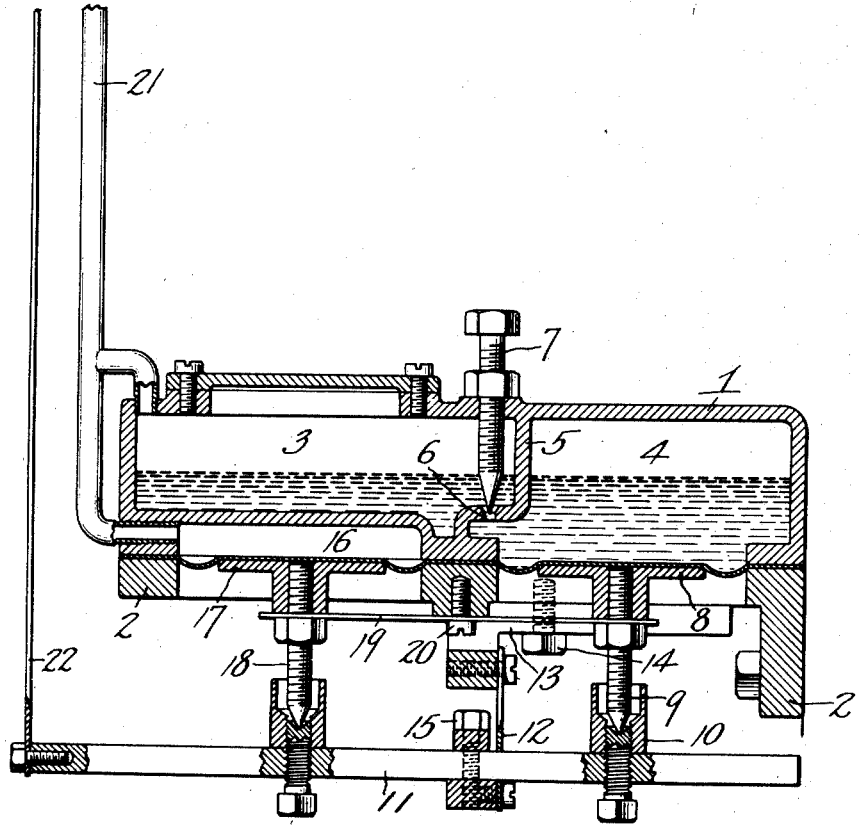
WITNESS
Oliver W. Holmes
INVENTOR
CHARLES H. SMOOT
BY Knight Bros
ATTORNEYS Patented Apr. 30, 1929.

1,711,066

UNITED STATES PATENT OFFICE.

CHARLES H. SMOOT, OF MAPLEWOOD, NEW JERSEY.

REGULATOR.

Continuation of application Serial No. 103,182, filed April 19, 1926. This application filed April 29, 1927. Serial No. 187,519.

This application is a continuation of my prior application Serial No. 103,182, filed April 19, 1926.

My invention consists in a novel regulator which permits the introduction of an element of time into the control of any mechanism.

My apparatus effects its regulation in response to a controlling force impressed upon it and acts to give both an immediate response to a change in said force and delayed response thereto with any desired difference either in magnitude or direction between the initial and final response; the change in the response being effected gradually throughout the interval of the delay. My apparatus is not a time-delay mechanism in the sense in which a dash pot might be so considered, as a dash pot merely offers a resistance to quick operation which dies away upon the completion of a movement.

My invention is susceptible of many different uses in various kinds of regulation and I have shown and claimed specific applications thereof in my copending applications Serial No. 168,447, filed February 15, 1927, and Serial No. 143,415, filed October 22, 1926. The present application is concerned with the apparatus itself and not with any particular use thereof.

For a better understanding of my invention and the advantages pertaining thereto, reference should be had to the accompanying drawing, in which I have illustrated a vertical section of one specific embodiment of my invention.

In this drawing, I have shown a regulator which will give an immediate and exaggerated response to a change in the controlling force, which response will gradually decrease during a definite time interval to a steady value acting in the same direction as the exaggerated response.

The embodiment illustrated is, however, susceptible by simple manual adjustment of being otherwise used, as for example to give a final response in a direction oppoiste to the original response or to give a constant final response.

Referring to the drawing, 1 indicates a rigid or fixed casing adapted to be supported on a fixed bracket 2. This casing is made with two chambers numbered 3 and 4, a partition 5 being provided between them. At 6 is shown a restricted orifice in this partition and the amount of the restriction may be adjusted by screw 7. The chambers 3 and 4 are adapted to contain a heavy liquid such as glycerine or mercury, the level of which is normally above that of the orifice 6 in partition 5. The lower part of the chamber 4 is closed by a diaphragm or other yielding wall member 8, the stem 9 of which acts against a nut 10 secured to a lever 11. This lever has attached to it at its fulcrum point, a flexible suspension strip 12, the strip being hung from a bracket 13 secured to the fixed parts of the apparatus by a bolt 14. The hole in the bracket through which this bolt passes is preferably made slotted so that the bracket may be shifted when it is desired to change the ratio of leverages, the band 12 being secured by bolt 15 adjustable to the lever so that the lever itself will not have to be moved. In the embodiment illustrated, the stem 9 is shown as operating on a shorter leverage than is the stem 18. At 16 is shown a third chamber provided with a flexible diaphragm or other yielding wall member 17 in one of its walls, the stem 18 of this diaphragm acting on the lever 11 in opposition to the force on the diaphragm 8 exerted through stem 18. A flexible strip 19, secured by bolt 20 at a central point and at each end to the respective diaphragm stems, holds the stems in perfect parallelism without introducing frictional elements. A conduit 21 connected to both chambers 3 and 16 is attached to apply to such chambers simultaneously and instantly, any changes in the controlling pressure in conduit 21; the conduit 21 being connected to any desired source of controlling pressure such as a master controller.

In operation, an increase in pressure occurring in conduit 21 will be felt simultaneously in chambers 3 and 16. In chamber 3 this increase in pressure will tend to force the liquid through the restricted orifice 6 and into chamber 4 and thus to gradually increase the pressure upon diaphragm 8 to that within chamber 3; the time taken to equalize these pressures depending upon the setting of the screw 7. In chamber 16 the increase in pressure acts immediately upon lever 11 through the diaphragm 17 and stem 18 in a direction to exert a downward force to a member 22 attached to the end of the lever. The member 22 may lead directly to an element to be controlled or if desired to intermediate controlling means such as a balanced lever acted upon by other regulating forces. The downward force exerted upon the member 22 will be gradually reduced as the pressure builds up in chamber 4 by the action of this pressure upon the lever through the diaphragm 8 and stem 9 until a steady downward force is reached, the value of which depends upon the pressure in conduit 21 and upon the ratio of the leverages. The apparatus has thus operated to give an initial exaggerated response followed by a smaller response.

Should a decrease in pressure occur in conduit 21, the reverse operation occurs. The pressures in chambers 3 and 16 immediately decrease and that in chamber 4 gradually decreases so that the first effect is an exaggerated reduction in the downward force upon the member 22 due to the pressure upon diaphragm 8 being greater than that upon diaphragm 17, followed by a gradual increase in this downward force to some steady value intermediate that which existed before the pressure in conduit 21 decreased and that which occurred immediately upon this decrease.

It will be apparent that changes in the position of the fulcrum point of the lever will cause corresponding changes in operation. If, for instance, the fulcrum point is moved to a point where equal pressures upon the two diaphragms exert equal and opposite turning moments on the lever, then steady pressure in chambers 4 and 16 will cause the lever to exert no force upon the member 22; an increase in pressure in conduit 21 will cause an initial downward force upon the member 22 followed by a gradual but complete cancellation thereof as the increase in pressure is felt upon diaphragm 8; and a decrease in pressure in conduit 21 causes an initial upward force upon the member 22 which is gradually completely eliminated. If the fulcrum point is moved nearer to the point of contact of the stem 18 with the lever than to the point of contact of the stem 9 with the lever, the apparatus operates to give a final response in a direction opposite to the initial force, in other words an increase in pressure in conduit 21 causes an initial downward force to be applied to the member 22 which force will be gradually eliminated and an upward force substituted. If both of the stems 9 and 18 act upon the lever at the same side of the fulcrum point the apparatus will operate to give an initial response followed by a greater response in the same direction as the original response. Obviously weights could be applied to the lever to cause variation in any of the above described operations.

In the operation of the device, the trapped gas above the liquid in the chamber 4 acts as an elastic cushion and is a desirable feature of the preferred form of my invention. It could, however, be replaced by other elastic means such as springs. For economical construction, the casing 1 would probably be a metal casting in which case if the pressure in chamber 4 is greater than atmospheric, there will be a slow, but continuous leakage of gas through the walls of the casing. To compensate for this loss of gas the orifice 6 is so located in the partition 5 with reference to the amount of liquid within the casing as to permit some gas, at times of very high pressure in chamber 3, to pass through the orifice into chamber 4 to bubble up through the liquid and augment the amount of trapped gas.

I have now described my invention with reference to the preferred embodiment thereof. Obviously, many substitutions or changes in the construction and arrangement of parts may be made without departing from the spirit of my invention.

I claim:—

1. In a mechanism for regulators, the combination of a fixed casing having two chambers adapted to contain liquid with a restricted opening between the two chambers adapted to be covered by the liquid, one of the chambers having fixed content and the other having a yielding wall member responsive to the pressure of the liquid therein, a lever acted on by said yielding member, a third chamber having a yielding wall member responsive to the pressure therein and acting on the said lever, and a conduit connected to both the fixed content chamber and the third chamber for admitting pressure simultaneously to said chambers.

2. In a mechanism for regulators, the combination of a fixed casing having two chambers adapted to contain liquid with a restricted opening between the two chambers adapted to be covered by the liquid, one of the chambers having fixed content and the other having a flexible diaphragm responsive to the pressure of the liquid therein, a lever acted on by said diaphragm, a third chamber having a diaphragm responsive to the pressure therein also acting on the said lever, and a conduit connected to both the fixed content chamber and the third chamber for admitting pressure simultaneously to said chambers.

3. In a mechanism for regulators, the combination of a fixed casing having two airtight chambers adapted to contain liquid, with a restricted opening between the two chambers adapted to be covered by the liquid, one of the chambers having fixed content and the other having a flexible diaphragm responsive to the pressure of the liquid therein, a lever acted on by said diaphragm, a third chamber having a diaphragm acting on the said lever in opposition to the first-mentioned diaphragm and a conduit connected to both the fixed content chamber and the said third chamber for admitting pressure simultaneously to said chambers.

4. In a regulating mechanism, the combination of a fixed casing having two air-tight chambers adapted to contain liquid, with a restricted opening between the two chambers adapted to be covered by the liquid, one of the chambers having fixed content and the other having a flexible diaphragm responsive to the pressure of the liquid therein, a lever acted on by said diaphragm, a third chamber having a diaphragm acting on the said lever in opposition to the first-mentioned diaphragm, means for adjusting the ratio of leverage of the two diaphragms, and a conduit connected to both the fixed content chamber and the said third chamber for admitting pressure simultaneously to said chambers.

5. In a regulator, the combination of a fixed casing having two chambers adapted to contain liquid with a restricted opening between the two chambers adapted to be covered by the liquid, one of the chambers having fixed content and the other having a flexible diaphragm responsive to the pressure therein, said other chamber having an elastic medium in contact with the liquid surface, a member acted upon by a movement of said diaphragm, a third chamber having a diaphragm adapted to move said member, and means connected to both said fixed content chamber and said third chamber for applying a controlling pressure simultaneously to said chambers.

6. In a regulator, the combination of a fixed casing having two chambers with a restricted opening between the chambers, one of said chambers having a fixed content and being connected with a source of controlling pressure, and the other having a flexible diaphragm forming one wall thereof, a body of liquid in said chambers, said restricted opening being located wholly within said liquid except at times of maximum controlling pressure, a third chamber also connected with the source of controlling pressure and provided with a flexible diaphragm, and a member moved in response to movements of both of said diaphragms.

CHARLES H. SMOOT.